(12) United States Patent
Erpenbeck

(10) Patent No.: US 10,107,318 B2
(45) Date of Patent: Oct. 23, 2018

(54) APPARATUS FOR ATTACHING A FIRST COMPONENT TO A SECOND COMPONENT

(71) Applicant: WITTE Automotive GmbH, Velbert (DE)

(72) Inventor: Till Erpenbeck, Velbert (DE)

(73) Assignee: WITTE AUTOMOTIVE GMBH, Velbert (DE)

(*) Notice: Subject to any disclaimer, the term of this patent is extended or adjusted under 35 U.S.C. 154(b) by 76 days.

(21) Appl. No.: 15/354,459

(22) Filed: Nov. 17, 2016

(65) Prior Publication Data
US 2017/0152876 A1 Jun. 1, 2017

(30) Foreign Application Priority Data
Dec. 1, 2015 (DE) .................. 10 2015 120 837

(51) Int. Cl.
*F16B 43/02* (2006.01)
*F16B 5/02* (2006.01)
(Continued)

(52) U.S. Cl.
CPC ............ *F16B 5/025* (2013.01); *F16B 5/0233* (2013.01); *F16B 5/0258* (2013.01);
(Continued)

(58) Field of Classification Search
CPC ........ F16B 5/025; F16B 5/0258; F16B 39/26; F16B 39/284; F16B 39/30; F16B 43/02
(Continued)

(56) References Cited

U.S. PATENT DOCUMENTS

| 3,346,032 A | * | 10/1967 | Gulistan | ............... F16B 41/002 411/349 |
| 4,655,660 A | * | 4/1987 | McGlone | .............. F16B 37/122 411/366.2 |

(Continued)

FOREIGN PATENT DOCUMENTS

| DE | 4224575 A1 | 3/1993 |
| DE | 4426785 C1 | 8/1995 |

(Continued)

OTHER PUBLICATIONS

Search Report from German Patent Office for German Patent Application No. 10 2015 120 837.7 dated Oct. 21, 2016, 9 pages.

*Primary Examiner* — Roberta S Delisle
(74) *Attorney, Agent, or Firm* — Cantor Colburn LLP

(57) ABSTRACT

The invention relates to an apparatus for attaching a first component to a second component and comprises a base element which has a thread which defines a thread axis; a connection means for direct or indirect connection with shape matching and/or material continuity of the base element to the second component; and an adjustment element which receives the first component and is in threaded engagement with the base element such that the position of the first component is adjustable relative to the second component, viewed in the direction of the thread axis, by a rotation of the adjustment element relative to the base element, with the base element and/or the adjustment element being at least partly elastically deformable such that the adjustment element receives the first component free of clearance and is in threaded engagement with the base element free of clearance.

20 Claims, 7 Drawing Sheets

Figure 1:
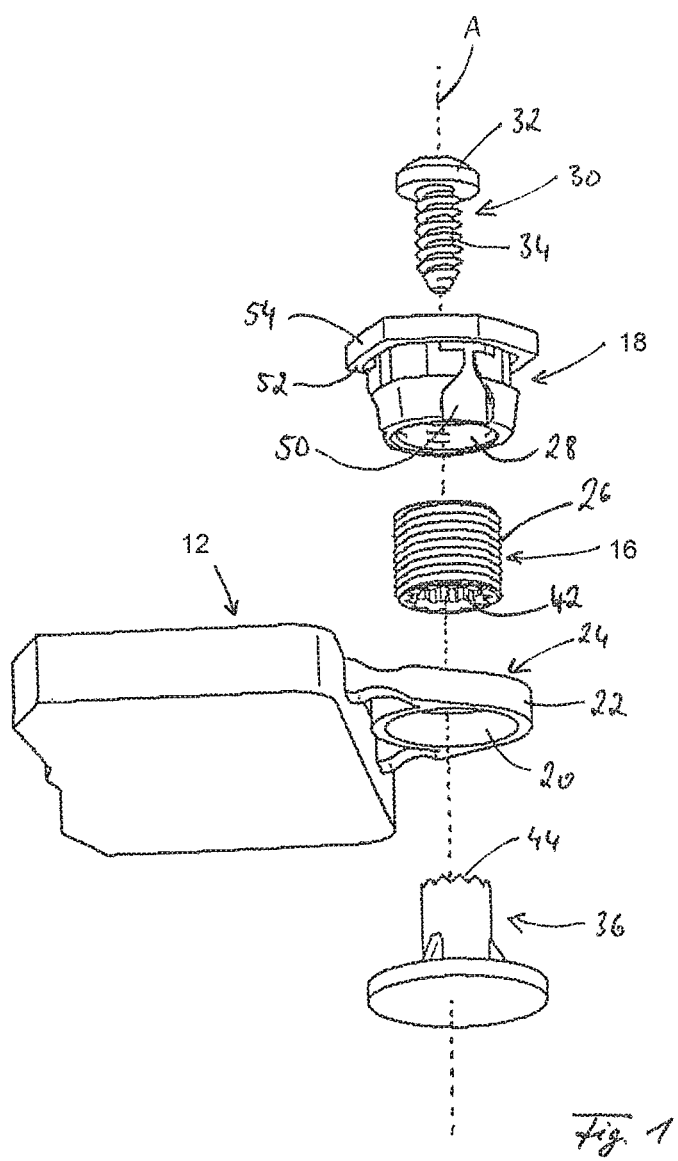

(51) Int. Cl.
| | | |
|---|---|---|
| *F16B 37/04* | (2006.01) | |
| *F16B 39/30* | (2006.01) | |
| *F16B 39/26* | (2006.01) | |
| *F16B 39/284* | (2006.01) | |

(52) U.S. Cl.
CPC ............ *F16B 37/043* (2013.01); *F16B 39/26* (2013.01); *F16B 39/284* (2013.01); *F16B 39/30* (2013.01); *F16B 43/02* (2013.01)

(58) Field of Classification Search
USPC .................. 411/546, 383, 432, 508–510
See application file for complete search history.

(56) References Cited

U.S. PATENT DOCUMENTS

| | | | | |
|---|---|---|---|---|
| 6,789,993 | B2 * | 9/2004 | Ozawa | F16B 5/0233 411/432 |
| 7,891,927 | B2 * | 2/2011 | Burger | F16B 5/0233 411/383 |
| 8,616,819 | B1 * | 12/2013 | Koster | F16B 21/02 411/418 |
| 9,829,020 | B2 * | 11/2017 | Ortega Dona | F16B 5/0233 |
| 9,829,021 | B2 * | 11/2017 | Johnson | F16B 5/025 |
| 2009/0067921 | A1 * | 3/2009 | Ito | F16B 5/0283 403/408.1 |
| 2013/0094921 | A1 * | 4/2013 | McClure | F16B 5/0225 411/45 |

FOREIGN PATENT DOCUMENTS

| | | |
|---|---|---|
| DE | 19839710 B4 | 4/2005 |
| DE | 202011103827 U1 | 7/2012 |

* cited by examiner

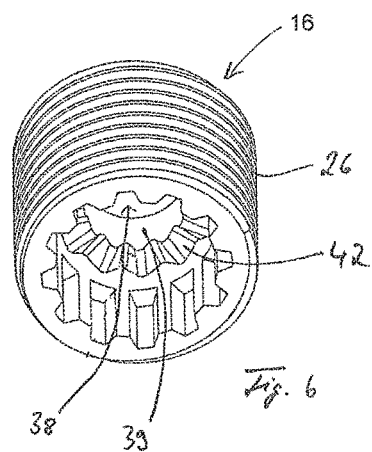
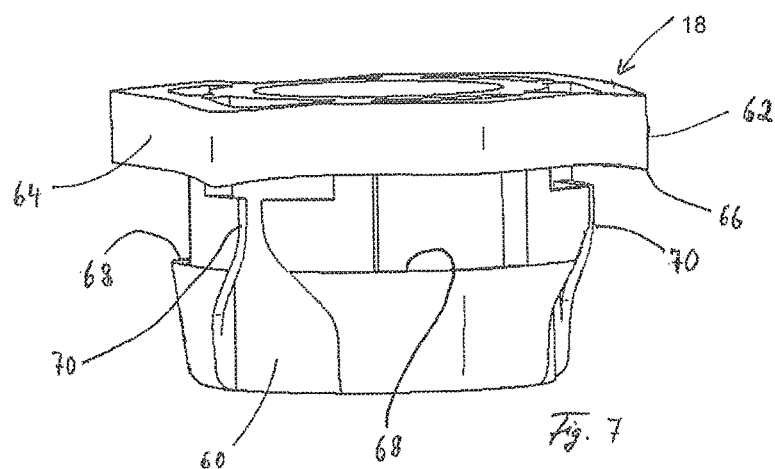
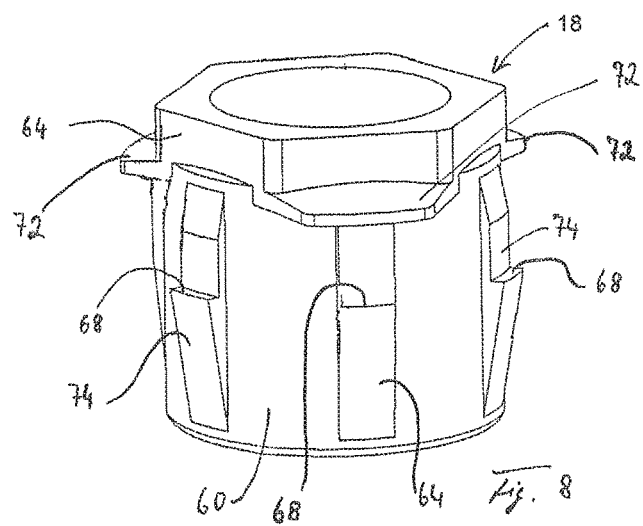

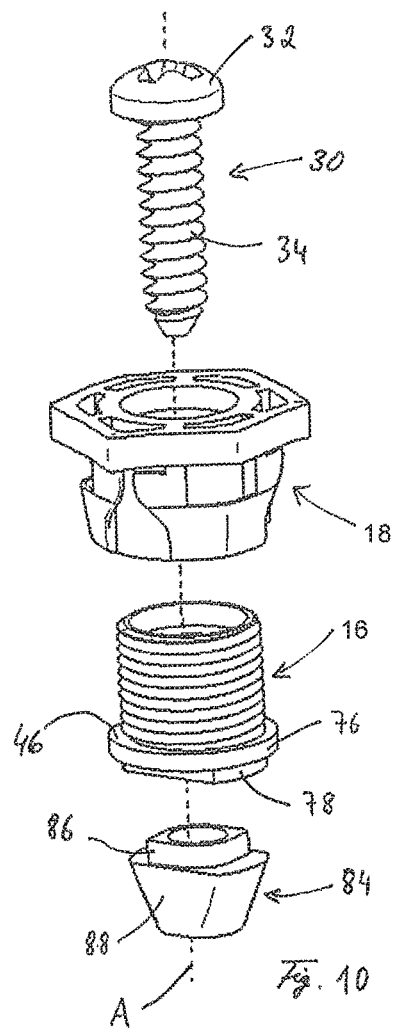
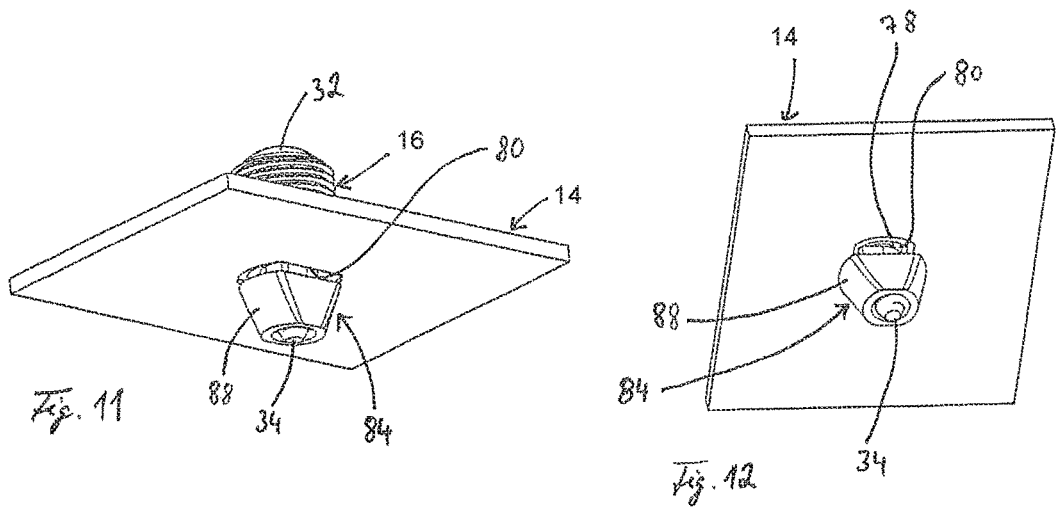

APPARATUS FOR ATTACHING A FIRST COMPONENT TO A SECOND COMPONENT

The present invention relates to an apparatus for attaching a first component to a second component comprising a base element which has a thread which defines a thread axis; a connection means for a direct or indirect connection with shape matching and/or with material continuity of the base element to the second component; and an adjustment element which is in threaded engagement with the base element and which is in contact with the first component.

Such apparatus are generally known and primarily serve to hold the first component and the second component at a distance in the direction of the thread axis or to bridge a spacing between them. For this purpose, the apparatus is located between the two components, with the apparatus being fastened to the second component, on the one hand, and being supported at the first component, on the other hand.

It is an object of the invention to fasten a first component to a second component such that an adjustment of the position of the first component relative to the second component is possible without the connection between the two components having to be released, with an independent adjustment of the position being suppressed after the setting of a desired position of the first component relative to the second component.

The above object is satisfied by an apparatus having the features of claim 1 and in particular in that the base element and/or the adjustment element is/are at least partly deformable, in particular elastically deformable, such that the adjustment element is in threaded engagement with the base element free of clearance and receives the first component free of clearance.

It is the general underlying idea of the invention to fasten a first component to a second component while using the apparatus in accordance with the invention such that the adjustment element is not supported at the first component, but rather such that the first component receives the first component free of clearance and thus forms a construction unit with it. The advantage hereby results that the first component can be connected to the second component and the position of the first component nevertheless remains adjustable relative to the second component without releasing the connection.

A further advantage of the apparatus in accordance with the invention comprises the apparatus only comprising a few components, whereby it can be manufactured in a simple and inexpensive manner. The simple manner of construction is accompanied by a simple operability of the apparatus in that the position of the first component relative to the second component can be adjusted by a simple rotation of the adjustment element relative to the base element.

The first component can, for example, be a sensor which is to be fastened to a body part (second component) of a motor vehicle. It is advantageous in this respect if the position of the sensor relative to the body part can be set after the attachment of the sensor to the body part in order, for example, thereby to ideally align the detection region of the sensor.

The first component can, however, also be an illumination arrangement which is provided for fastening to a body part (second component) of a motor vehicle. The illumination arrangement can be fastened to the body part and can be adjusted with respect to the irradiation properties and/or the ideal installation position of the illumination arrangement by means of the apparatus in accordance with the invention.

It is moreover conceivable that the first component can be tilted with respect to the second component by rotating the adjustment element when the first component is additionally fastened to at least one further fastening point at the second component spaced apart from the apparatus.

The base element and the adjustment element can each be formed from a plastic material, but other materials, such as metals, can also be considered as long as they are elastically deformable. In this respect, both the base element and the adjustment element can be produced from the same material. It is, however, also possible that the base element and the adjustment element are manufactured from respective different materials.

Advantageous embodiments of the invention can be seen from the dependent claims, from the description and from the drawings.

To fix the first component reliably in a set position relative to the second component even under physical influences such as temperature fluctuations or vibrations, it is advantageous if the threaded engagement between the base element and the adjustment element is self-locking in the assembled state.

In principle, a self-locking can be implemented in a threaded engagement by a suitable coordination of the respective thread tolerances. A thread self-locking can, however, also be achieved when the base element comprises a base element thread and the adjustment element comprises an adjustment element thread, when the base element thread and the adjustment element thread are adapted for a mutual threaded engagement, and when, in the non-assembled state of the apparatus, the base element thread has a first contour viewed in cross-section and the adjustment element thread has a second contour viewed in cross-section which is different from the first contour such that on a concentric alignment of the contours at least one radial overhang is present between them.

It is furthermore advantageous for a thread self-locking if, in the non-assembled state of the apparatus, one of the contours is preferably non-circular, in particular oval or ellipse-like, and defines a first periphery and the respective other contour is substantially circular and defines a second periphery. It has proved to be particularly advantageous for a particularly effective threaded engagement if the difference of the peripheries is as small as possible, is in particular substantially equal to zero. A deformation is thereby admittedly ensured in the assembled state of the apparatus, but at best a minimal stretching or compression of the deformable threaded element. The first periphery can in particular be substantially smaller than or equal to the second periphery.

It is particularly advantageous if, in the non-assembled state of the apparatus, the base element thread has a non-circular contour and the adjustment element thread has a circular contour and is deformable, in particular elastically deformable, such that the contour of the adjustment element thread adapts to the contour of the base element thread in the assembled state of the apparatus. It is naturally also conceivable, however, that the base element thread has a circular contour and the adjustment element thread has a non-circular, in particular oval or ellipse-like contour.

Despite the self-locking of the threaded engagement between the base element and the adjustment element, a deliberately induced adjustment of the position of the adjustment element relative to the base element and thus ultimately of the position of the first component relative to the second component should be possible. It is advantageous for this purpose if at least one engagement feature is provided at the adjustment element, in particular for a tool, so that the adjustment element can be rotated via the engagement feature and the position can thus be adjusted relative to the base element. In accordance with an embodiment, the engagement feature is arranged at an outer jacket surface of the adjustment element. The engagement feature can, for example, be designed in the form of a prismatic outer contour, in particular in the form of a quadratic or hexagonal outer contour, of the outer jacket surface so that a wrench can be brought into engagement with the engagement feature for the purpose of rotation.

In order in addition to the threaded engagement between the base element and the adjustment element, also to protect the connection between the adjustment element and the first component received thereby from external physical influences such as temperature fluctuations or vibration, at least one means is preferably provided for a shape-matched and/or force-transmitting fixing of the first component to the adjustment element.

The adjustment element can have at least one radially outwardly projecting protrusion and at least one radially outwardly projecting counter-bearing for the axial fixing, with the at least one protrusion and the at least one counter-bearing being arranged with a spacing from one another in the direction of the threaded axis to receive the first component between them in an at least approximately shape-matched manner. The protrusion and the engagement feature advantageously form a unit for rotating the adjustment element.

At least one spring element can be provided at the adjustment element for the radial fixing and can be deformed by the received first component in the radial direction against its return force. In accordance with an embodiment, the spring element can be arranged between the protrusion and the spring element.

A plurality of protrusions and/or a plurality of counter-bearings and/or a plurality of spring elements are respectively arranged distributed, in particular distributed evenly, about the adjustment element in the peripheral direction.

The position of the adjustment element is preferably adjustable independently of the connection of the base element to the second component.

In accordance with a preferred embodiment, a holder is provided which can be rotationally fixedly mounted to the second component and which can be brought into engagement with shape matching with the base element. The holder can in this respect be fastened to the second component with material continuity, for example by joining by means of an organic or inorganic adhesive, by soldering, by welding and/or comparable. Alternatively, the holder can also be formed in one piece with the second component.

The shape matching between the base element and the holder can be established, for example, in that the holder comprises an end face which faces the base element and at which at least one elevated portion or recess is formed and the base element has a face which faces the holder at the constriction of the passage and at which at least one corresponding recess or elevated portion is formed.

A connection means for connecting the base element to the second component or to a holder mounted thereto can furthermore be provided which comprises a head and a shaft, for example a screw or a rivet, and the base element and, optionally, the holder, can have a passage which extends in the direction of the thread axis for receiving the shaft, with a constriction projecting radially inwardly in the passage of the base element, at the side of which constriction remote from the holder an abutment surface is formed for the head of the connection means.

In accordance with a further embodiment, the base element can form a non-round continuation at its end facing the second component and the second component can have a correspondingly shaped opening into which the non-round continuation of the base element can be inserted.

In addition to a shape-matched connection between the base element and the second component, a direct or indirect connection with material continuity is alternatively or additionally also conceivable between the base element and the second component, for example by joining using an organic or inorganic adhesive, by soldering, by welding and/or comparable.

The base element advantageously has a security against unscrewing for the adjustment element which limits a movement of the adjustment element away from the second component. Alternatively or additionally, a security against screwing in can be provided which limits a movement of the adjustment element toward the second component.

In accordance with an even further embodiment, a threaded bolt formed at the first component and a screw nut which can be screwed onto the threaded bolt are provided to connect the base element to the second component, with the screw nut being received in a passage of the base element extending in the direction of the thread axis and the threaded bolt being received in a constriction projecting radially inwardly from the passage such that the constriction is clamped between the screw nut and the second component in the assembled state of the apparatus.

A bush which has a flange facing the second component can preferably be arranged between the constriction and the threaded bolt. The flange is outwardly bounded by an outer flange side, with the outer flange side advantageously being profiled and being in engagement with shape matching with a complementarily profiled portion in the constriction to fix the base element rotationally fixedly to the second component.

The adjustment element can furthermore comprise an inner hollow cylinder and an outer hollow cylinder which coaxially surround the thread axis, with the inner hollow cylinder and the outer hollow cylinder being held radially at a distance by engagement features.

Figure 2:
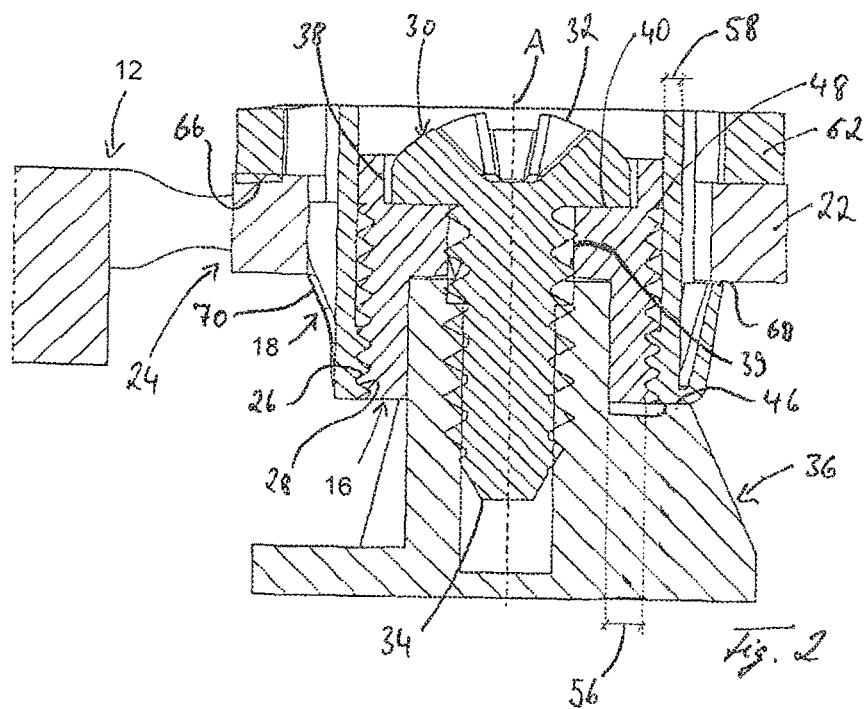
Figure 3:
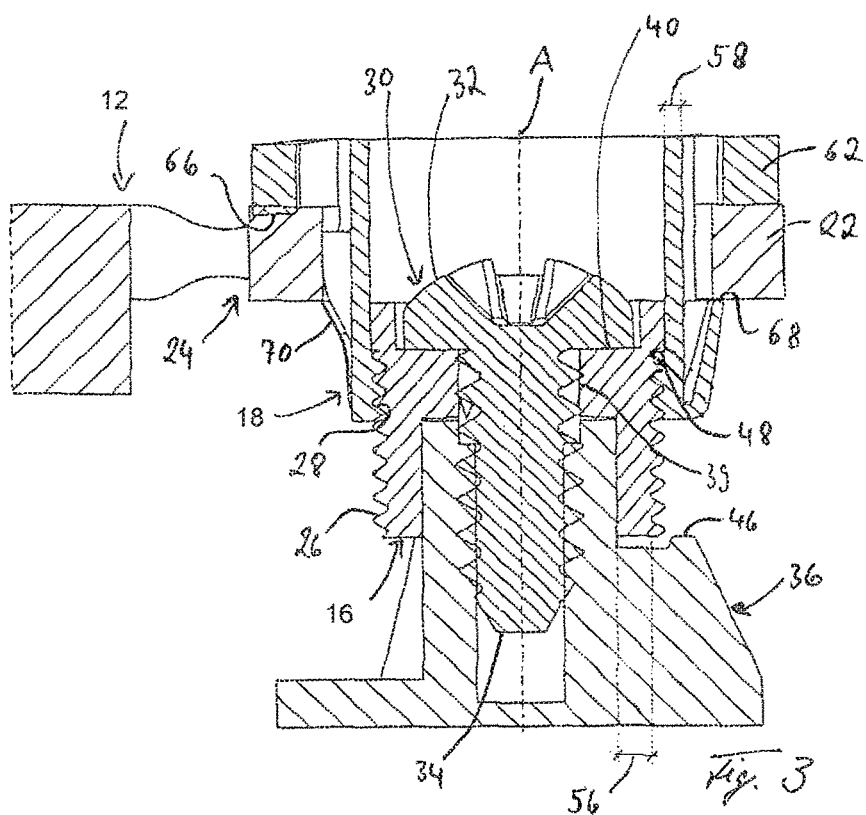
Figure 4:
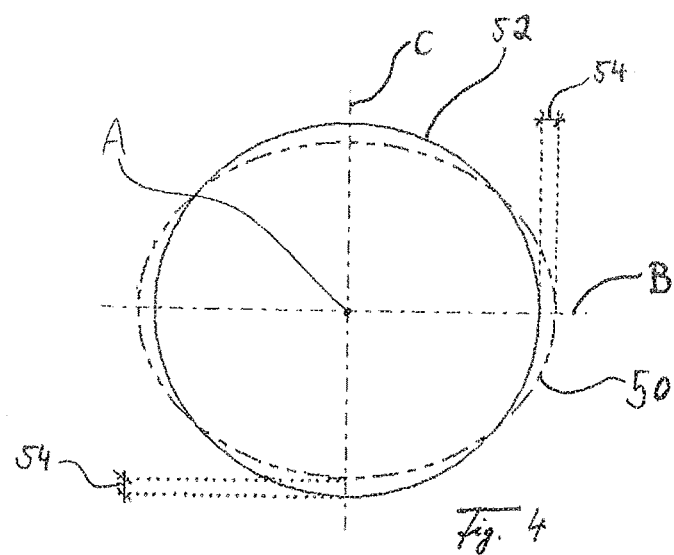
Figure 5:
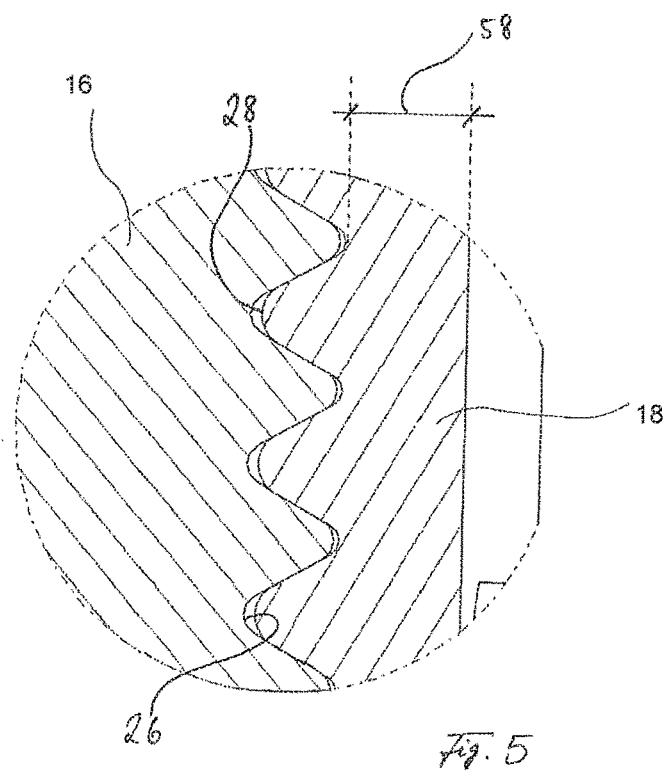
Figure 9:
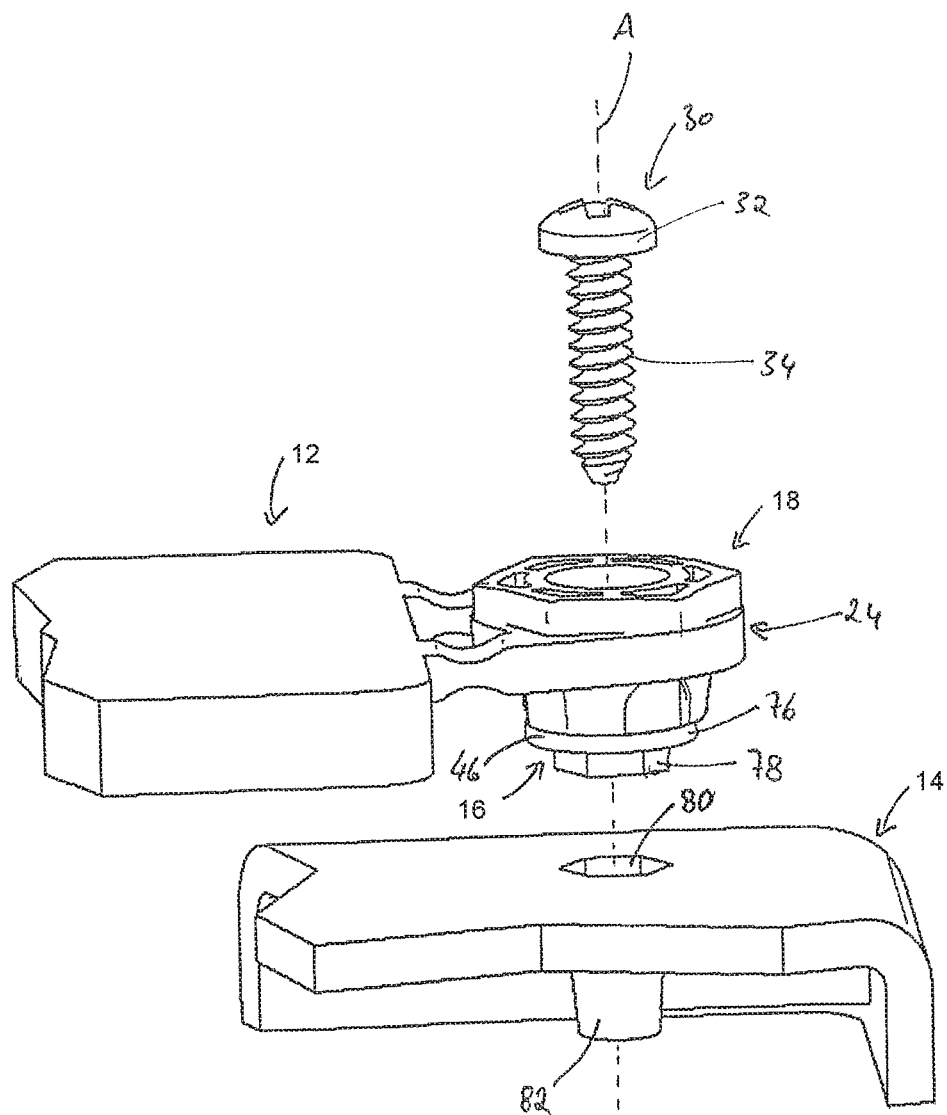
Figure 13:
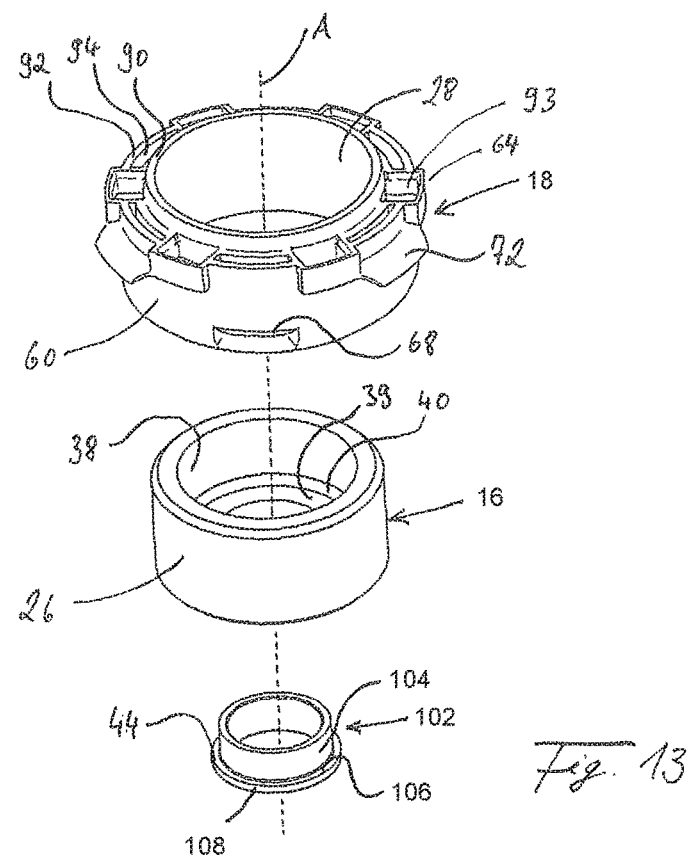
Figure 14:
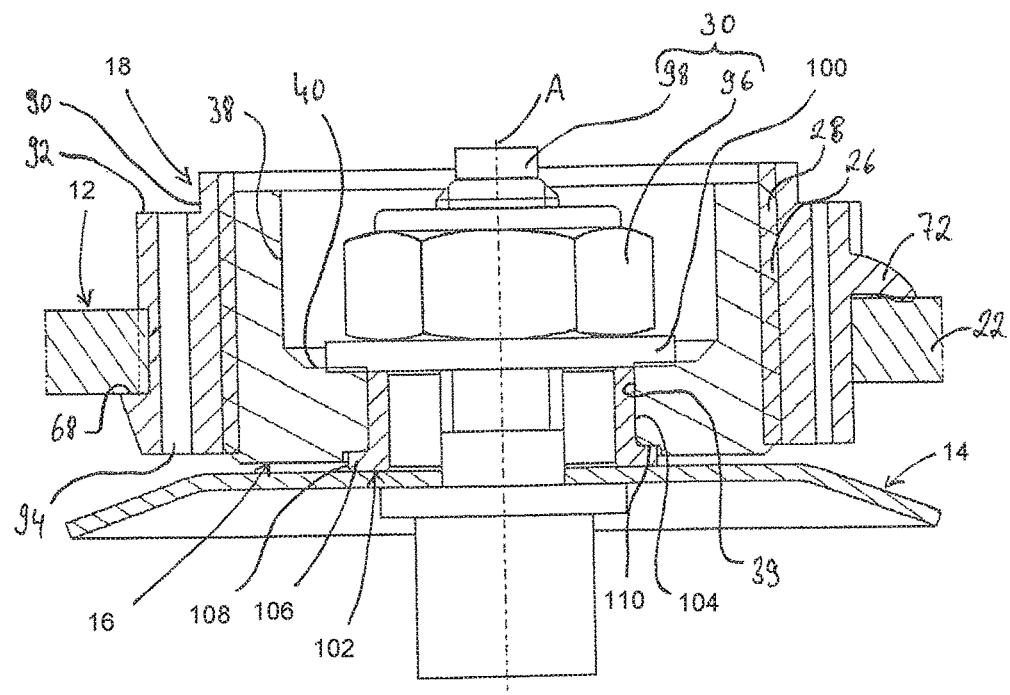

The invention will be described in the following purely by way of example with reference to possible embodiments and to the enclosed drawings. There are shown:

FIG. 1 an exploded representation of an apparatus in accordance with the invention in accordance with a first embodiment;

FIG. 2 a sectional view through the assembled apparatus of FIG. 1 in a screwed-in end position of the adjustment element;

FIG. 3 a sectional view through the assembled apparatus of FIG. 1 in an unscrewed end position of the adjustment element;

FIG. 4 a schematic representation of the contours of a base element thread and of an adjustment element thread of the apparatus of FIG. 1 in the non-assembled state;

FIG. 5 a detailed view of a threaded engagement between the base element thread and the adjustment element thread of the apparatus of FIG. 1 in the assembled state;

FIG. 6 a perspective view of the base element of FIG. 1;

FIG. 7 a perspective view of an adjustment element of FIG. 1;

FIG. 8 a perspective view of a variant of the adjustment element of FIG. 7;

FIG. 9 a partial exploded representation of an apparatus in accordance with the invention in accordance with a second embodiment;

FIG. 10 an exploded representation of an apparatus in accordance with the invention in accordance with a third embodiment;

FIG. 11 a perspective view of the partly assembled apparatus of FIG. 10 in a pre-installation position;

FIG. 12 a perspective view of the partly assembled apparatus of FIG. 10 in a final installation position;

FIG. 13 an exploded representation of an apparatus in accordance with the invention in accordance with a fourth embodiment; and FIG. 14 a part-sectional view of the apparatus of FIG. 13 in the assembled state.

FIG. 1 shows an exploded representation of a first embodiment of an apparatus in accordance with the invention for attaching a first component 12, here a sensor, to a second component 14 (see FIG. 9), for example to a body part of a motor vehicle. The apparatus comprises a base element 16 and an adjustment element 18. The first component 12 is received by the adjustment element 18, as is shown by way of example in FIG. 9. For this purpose, the first component 12 has a cut-out 20 which is defined by a wall 22 which, as shown in FIG. 1, forms a protruding part 24 at the first component 12.

The base element 16 is provided at its outer side with a base element thread 26 which defines a thread axis A. The adjustment element 18 is formed in the manner of a screw nut and has an adjustment element thread 28 at its inner side. In the assembled state, the base element 16 is in threaded engagement with the adjustment element 18 via the base element thread 26 and the adjustment element thread 28, as is shown, for example, in FIGS. 2 and 3. In principle, the base element 16 can also have an internal thread and the adjustment element 18 can have an external thread for this purpose.

The apparatus additionally comprises a connection means 30 which, in the embodiment shown in FIG. 1, is a screw which has a head 32 and a shaft 34. The connection means 30 serves for the fixing of the base element 16 to the second component 14, with, as can be recognized in FIG. 1, the fixing taking place indirectly via a holder 36 which can in turn be connected with material continuity to the second component 14 by joining by means of adhesive, soldering or welding. Alternatively, the holder 36 can also be formed in one piece with the second component 14. It is generally also conceivable to use a rivet instead of a screw as the connection means 30.

As FIGS. 2 and 3 show, the base element 16 has an axial passage 38 and a constriction 39 which projects radially inwardly therein and which forms at the side remote from the holder 36 an abutment surface 40 which the end of the head 32 of the connection means 30 at the shaft side contacts in the assembled state and thus fixes the base element 16 axially to the holder 16.

The connection of the base element 16 and the holder 36 is additionally rotationally fixed with respect to a rotation about the thread axis A in that a plurality of recesses and elevated portions 42, which are arranged at a surface of the constriction 39 of the passage 38 of the base element 16 facing the holder 36 (FIG. 6), engage in a shape-matched manner into elevated portions and recesses 44 which are complementary thereto and which are arranged at the end face of the holder 36 facing the base element 16 (FIG. 1). The elevated portions and recesses 42, 44 are preferably arranged distributed equally viewed in the peripheral direction.

Alternatively, the base element 16 could also be attached to the second component 14 without a holder 36 with direct material continuity, for example by joining by means of adhesive, soldering or welding.

FIG. 2 shows the adjustment element 18 in a completely screwed in position and FIG. 3 shows the adjustment element 18 in a completely unscrewed position. The completely screwed in and completely unscrewed positions define an adjustment path which preferably amounts to at least 4 mm. So that the adjustment element 18 cannot be rotated beyond the base element 16 when being screwed in, a screw-in protection 46 is provided at the holder 36 in the form of a shoulder at which the end of the adjustment element 18 facing the second component 14 abuts in the completely screwed in position. A protection against unscrewing 48 is equally provided at the base element 16 at which the end of the adjustment element 28 remote from the second component 14 abuts in the completely unscrewed position and thus protects the adjustment element 18 from being unscrewed from the base element 16.

It is advantageous in design if the adjustment element 18 cannot rotate independently relative to the base element 16 and if the threaded engagement between the adjustment element 18 and the base element 16 is insensitive to external physical influences such as vibrations or temperature fluctuations. This is achieved by a thread self-locking between the base element thread 26 and the adjustment element thread 28 as will be explained in the following.

In the non-assembled state, the base element thread 26 has a first contour 50 and a first periphery in a plane perpendicular to the thread axis A and the adjustment element thread 28 has a second contour 52 and a second periphery in a plane perpendicular to the thread axis A. In this respect, the two contours 5, 52 differ in the non-assembled state such that there is at least a radial overhang between them (FIG. 4).

A preferred embodiment is shown in FIG. 4 in which the adjustment element thread 28 has a substantially circular contour 52, whereas the contour 50 of the base element thread 26 is not circular, but is rather oval or ellipse-like. The contours 50, 52 shown in FIG. 4 lie in a plane which is spanned by two axes B and C, with the axis B and the axis C being aligned perpendicular to one another and being aligned perpendicular to the thread axis A, and with the thread axis A extending through the point of intersection of the two axes B and C. The oval or ellipse-shaped contour 50 of the base element thread 26 has a radial overhang 54 in the direction of the axis B compared to the substantially circular contour 52 of the adjustment element thread 28. In contrast, a radial overhang 54 of the substantially circular contour 52 of the adjustment element 18 is present in the direction of the C axis compared to the oval or ellipse-like contour 50 of the base element 16.

It is decisive for an effective thread self-locking that the periphery of the first contour 50, i.e. that is of the base element thread 26, is smaller than or equal to the periphery of the second contour 52, i.e. that is of the adjustment element thread 28, with the threaded engagement being particularly effective when the difference of the two peripheries is as small as possible and is preferably equal to zero. A thread self-locking is ultimately established in that at least one of the contours 50, 52 adapts to the other under a load from the base element 16 and/or the adjustment element 18 in the assembled state, with the adaptability depending on the wall thicknesses of the adjustment element 18 and of the base element 16.

It can be recognized with reference to FIG. 2 or FIG. 3 that the wall thickness 56 of the base element 16 is thicker here than the wall thickness 58 of the adjustment element 18.

Accordingly, the adjustment element 18 is more easily deformable with respect to the thicker base element 16 so that the contour 52 of the adjustment element thread 28 adapts to the contour 50 of the base element thread 26 in the assembled state of the apparatus. It is, however, also possible that, conversely, the base element 16 has a smaller thickness than the adjustment element 18 and the contour 50 of the base element thread 26 consequently adapts to the contour 52 of the adjustment element thread 28 in the assembled state of the apparatus. The deformation of the thinner element is preferably elastic.

As can be seen in FIG. 5, the base element thread 26 and the adjustment element thread 28 engage into one another free of clearance as a consequence of the deformation of the thinner element in the assembled state of the apparatus so that the base element thread 26 and the adjustment element thread 28 are in engagement in a shape-matched and force-transmitting manner in the assembled state of the apparatus and the resulting thread self-locking is permanently ensured.

Advantageously, not only the threaded engagement between the base element 16 and the adjustment element 18 is insensitive with respect to external physical influences such as vibrations or temperature fluctuations, but also the reception of the first component 12 by the adjustment element 18, as will be explained in the following.

As FIG. 7 shows, the adjustment element 18 has a protrusion 62 at the end of its outer jacket surface 60 remote from the second component 14. It is understood that the protrusion 62 can also be formed at another point of the outer jacket surface 60, in particular at the end of the adjustment element 18 facing the second component 14. An engagement feature 64 for a tool, not shown, is provided at the protrusion 62, here in the form of an outer contour of the protrusion 62 which is oriented perpendicular to the thread axis A and which describes a regular n-gon with n corners 66, where n is a natural whole number. n=6 is preferred so that the outer contour of the protrusion 62 represents a hexagon. The outer contour of the protrusion 62 is preferably complementary to the inner profile of a wrench, not shown. If the inner profile of the wrench and the protrusion 62 are in engagement, the position of the adjustment element 18 relative to the base element 16 can be adjusted by rotating the wrench about the thread axis A. The position of the first component 12 received by the adjustment element 18 relative to the second component 14, to which the base element 16 is fastened, can thus be set.

The protrusion 62 projects axially in the direction of the second component 14 in the region of its corners 66. In addition, counter-bearings 68 projecting radially outwardly are formed axially to the protrusion 62 at the outer jacket surface 60 of the adjustment element 18. Together with the axially projecting corners 66 of the protrusion 62, the counter-bearings 68 form an axial fixing for the first component 12 at the adjustment element 18 in that the projecting corners 66 and the counter-bearings 68 are in force-transmitting engagement with the wall 22 of the part 24 projecting from the first component 12 (FIGS. 2 and 3).

Spring elements 70 are provided between the protrusion 62 and the counter-bearings 68 for the radial fixing of the first component 12 at the adjustment element 18. The spring elements 70 are oversized with respect to the cut-out 20 of the first component 12 so that the spring elements 70 press in a force-transmitting manner against the inner side of the wall 22 defining the cut-out 22 in the assembled state of the apparatus.

The axial and radial fixing of the first component 12 to the adjustment element 18 thus ensures a clearance-free reception of the first component 12 by the adjustment element 18.

A variant of the adjustment element 18 of FIG. 7 is shown in FIG. 8 in which an end section of the outer jacket surface 60 remote from the second component 14 is itself configured as an engagement feature 64. Wing-like, resilient projections 72 extend radially outwardly from the outer jacket surface 60 from an end of the engagement feature 64 facing the second component 14.

Axial ribs 74 are additionally provided at the outer jacket surface 60 which form radially outwardly projecting counter-bearings 68. The projections 72 and the axial ribs 74 are arranged evenly distributed at the outer jacket surface 60 viewed in the peripheral direction. As FIG. 8 shows, the same number of projections 72 and axial ribs 74 does not necessarily have to be provided. The adjustment element 18 shown here specifically has three projections 72 and six axial ribs 74. It is understood that the projections 72 and the axial ribs 74 can also be arranged at a different point at the outer jacket surface 60 than that described here, for example at the end of the adjustment element 18 facing the second component 14.

In a similar manner to the already described variant of the adjustment element 18 of FIG. 7, the projections 72 and the counter-bearings 68 serve for the axial fixing of the first component 12 to the adjustment element 18 in that the projections 72 and the counter-bearings 68 are in force-transmitting engagement with the wall 22 defining the cut-out 20 at the first component 12 in the assembled state of the apparatus. To promote the axial fixing of the first component 12 to the adjustment element 18, the projections 72 are slightly inclined in the direction of the counter-bearings 68.

The axial ribs 74 are oversized with respect to the cut-out 20 of the first component 12 such that the axial ribs 74 serve in a similar manner to the spring elements 70 of the variant of the adjustment element 18 shown in FIG. 7 to press against the inner side of the wall 22 defining the cut-out 20 in a force transmitting manner i the assembled state of the apparatus and thus fix the first component 12 radially to the adjustment element 18.

To facilitate the introduction of the adjustment element 18 into the cut-out 20, the counter-bearings 68 of both the embodiment shown in FIG. 7 and of the variant of this embodiment shown in FIG. 8 taper in the direction of the end of the adjustment element 18 remote from the engagement feature 64.

The axial and radial fixing of the first component 12 at the adjustment element 18 has the effect that the first component 12 is supported at the adjustment element 18 in a largely insensitive manner with respect to external physical influences such as vibrations or temperature fluctuations.

FIG. 9 shows a partial exploded view of a second embodiment of the apparatus which only differs from the above-described first embodiment in that a radially outwardly projecting annular widened portion 76 adjoins the end of the base element 16 facing the second component 14 and a continuation 78 of the base element 16 extends axially in the direction of the second component 14 from said widened portion. The continuation 78 is received by an opening 80 of the second component 14 such that the base element 16 can be attached to the second component 14 directly, that is without using a holder 36, with the side of the annular widened portion 76 facing the second component 14 serving as a support on the second component 14. The side of the annular widened portion 76 remote from the second component 14 additionally satisfies the function of a screw-in projection 46 for the adjustment element 18. At the side of the second component 14 remote from the base element 16, an internal thread section 82 extends away from the opening 80 and is designed in one piece with the second component 14 and serves for the reception of the connection means 30. The fixing of the base element 16 to the second component 14 with the aid of the connection means 30 takes place in this embodiment in an analog manner to the above-described fastening of the base element 16 to the holder 36.

To connect the base element 16 rotationally fixedly to the second component 14, the continuation 78 of the base element 16 has a non-round outer contour and the opening 80 has a non-round inner contour complementary thereto so that the continuation 78 and the opening 80 are in engagement with shape matching in the assembled state of the apparatus. The non-round outer contour of the continuation 78 and the non-round inner contour of the opening 80 can, for example, adopt the shape of a regular polygon, for example of a substantially equilateral hexagon.

An exploded representation of a third embodiment of the apparatus is shown in FIG. 10 which differs from the second embodiment in that the non-round outer contour of the continuation 78 has a $C_2$ symmetry with respect to the thread axis A, that is that the non-round outer contour can be moved about the thread axis A in itself by a rotation about 180°. The opening 80 has a complementary non-round inner contour. The third embodiment furthermore differs from the second embodiment in that the internal threaded section 82 is formed as a separate counter-piece 84 to the second component 14, with the counter-piece 84 being able to be a slot nut, for example. The counter-piece 84 likewise has a non-round outer contour which is oriented perpendicular to the thread axis A and which substantially corresponds to the non-round inner contour of the opening 80 so that the counter-piece 84 can be led through the opening 80. The counter-piece 84 additionally comprises a first section 86 which faces the base element 16 and a second section 88 which is remote from the base element 16, with the first section 86 being radially inwardly offset with respect to the second section 88 such that the first section 86 is freely rotatable in the opening 80 about the thread axis A, whereas the second section 88 can be brought into engagement with the rear side of the second component 14 remote from the apparatus (FIG. 12).

FIGS. 11 and 12 show how the attachment of the base element 16 to the second component 14 takes place in accordance with the third embodiment. In this respect, the adjustment element 18 and the first component 12 are not shown in FIGS. 11 and 12 for better illustration. The connection means 30 supporting the base element 16 and the adjustment element 18 is first partly screwed into the counter-piece 84. The counter-piece 84 is subsequently led through the opening 80 until the annular widened portion 76 of the base element 16 contacts a front side of the second component 14 which faces the apparatus. The second section 88 can taper toward the end remote from the apparatus for a better introduction of the counter-piece 84 into the opening 80.

After the leading of the counter-piece 84 through the opening 80, the counter-piece 84 is rotated about the thread axis A such that the counter-piece 84 is transverse to the opening 80.

The counter-piece 84 blocks against the rear side of the second component 14 by a subsequent tightening of the connection means 30, whereby the apparatus is fastened to the second component 14. It is understood that the continuation 78, the opening 80 and the counter-piece 84 can have different suitable contours which allow the counter-piece 84 to be able to contact the rear side of the second component 14 remote from the apparatus.

FIGS. 13 and 14 show a fourth embodiment of the apparatus. An exploded representation of the fourth embodiment is shown in FIG. 13, with the first component 12 and the second component 14 not being shown for better illustration. FIG. 14 shows the assembled apparatus in accordance with the fourth embodiment in a part sectional view.

The adjustment element 18 in accordance with the fourth embodiment comprises a wall which comprises an inner hollow cylinder 90 and an outer hollow cylinder 92 radially outwardly spaced apart therefrom, with the two hollow cylinders 90, 92 coaxially surrounding the thread axis A. The outer side of the outer hollow cylinder 92 forms an outer jacket surface 60 of the adjustment element 18. Wing-like projections 72 and counter-bearings 68 are arranged at the outer jacket surface 60. The projections 72 and counter-bearings 68 serve for the axial fixing of the first component 12 to the adjustment element 18, as was already described above in connection with the variant of the adjustment element 18 shown in FIG. 8. An adjustment element thread 28 is configured at the inner side of the inner hollow cylinder 90 and is adapted to be in threaded engagement with a base element thread 26 of the base element 16 in the assembled state of the apparatus. By rotating the adjustment element 18, its position relative to the base element 16 can be adjusted in the direction of the thread axis A, with the adjustment path between the completely screwed in position and the completely unscrewed position of the adjustment element 18 preferably amounting to at least 4 mm.

To rotate the adjustment element 18, engagement features 64 are formed in the region of the end of the adjustment element 18 remote from the second component 14 in the form of a plurality of cavities 93 which are spaced apart from one another, which are distributed in the peripheral direction, in particular evenly distributed, and which extend radially outwardly from the outer side of the inner hollow cylinder 90 beyond the outer hollow cylinder 92. The open side of a respective cavity 93 faces away from the second component 14, whereby the cavities 93 serve for the reception of prongs of a castle nut wrench for the purpose of rotating the adjustment element 18. In the embodiment shown in FIG. 13, six cavities 93 are provided which are evenly distributed in the peripheral direction. It is, however, possible that the number and the position of the cavities 93 can vary.

The boundaries surrounding the cavities 93 connect the inner hollow cylinder 90 and the outer hollow cylinder 92 to one another such that a gap 94 is present between the outer side of the inner hollow cylinder 90 and the inner side of the outer hollow cylinder 92. Since the inner hollow cylinder 90 and the outer hollow cylinder 92 are consequently only connected to one another via the boundaries surrounding the cavities 93 at the side of the adjustment element 18 remote from the second component 14, the region of the outer hollow cylinder 92 facing the second component 14 can be deflected radially and resiliently against a return force, whereby the reception of the first component 12 by the adjustment element 18 is promoted. The return force additionally has the effect that the outer jacket surface 60 of the adjustment element 18 presses in a force-transmitting manner against the wall 22 of the cut-out 20 formed at the first component 12 in the assembled state of the apparatus so that the outer hollow cylinder 92 serves as a spring element 70 and thus radially fixes the first component 12.

Wing-like projections 72 and counter-bearings 68 axially spaced apart therefrom are provided at the outer jacket surface 60 for the axial fixing of the first component 12 to the adjustment element 18. In the embodiment shown in FIG. 13, the adjustment element 18 comprises three projections 72 and three counter-bearings 68 respectively. The projections 72 and the counter-bearings 68 are arranged evenly distributed in the peripheral direction about the outer jacket surface 60. The projections 72 and the counter-bearings 68 are arranged alternately in the peripheral direction, i.e. the projections 72 and the counter-bearings 68 are arranged offset by 60° from one another. It is understood that the number of projections 72 and of counter-bearings 68 as well as their position at the outer jacket surface 60 can differ herefrom.

In the same way as the base element 16 of the first embodiment, the base element 16 in accordance with the fourth embodiment comprises the base element thread 26 (not shown in FIG. 13) at its outer side and a passage 38 at its inner side. The base element thread 26 is in threaded engagement (shown schematically in FIG. 14) with the adjustment element thread 28 in the assembled state of the apparatus. A constriction 39 projects radially inwardly at the inner side of the passage 38 and forms an abutment surface 40 at the side remote from the second component 14. Unlike the base element 16 of the first embodiment, the constriction 39 is arranged in the region of the end of the base element 16 facing the second component 14.

The passage 38 is dimensioned such that both a screw nut 96 and a suitable tool, not shown, for adjusting the screw nut 96 can be received in its interior. The screw nut 96 can preferably be a self-locking hexagon nut. The screw nut 96 serves together with a threaded bolt 98 which is formed at the second component 14 as a connection means 30 for fixing the base element 16 to the second component 14, with the base element 16 being fastened indirectly to the second component 14 via a bush 102 in accordance with the fourth embodiment. The bush 102 is advantageously produced from a harder material, for example machining steel, than the base element 16.

The bush 102 comprises a hollow cylindrical section 104 which is received with shape matching in the constriction 39 of the base element 16 and a flange 106 which extends radially outwardly from the hollow cylindrical section 104 and which is radially outwardly bounded by an outer flange side 108. The flange 106 is received in a portion 110 complementary to the flange 106 on the side of the constriction 39 facing the second component 14 in the assembled state of the apparatus.

The outer flange side 108 is profiled for a rotationally fixed connection of the base element 18 and the bush 102 with respect to a rotation about the thread axis A and is in engagement with shape matching with a complementary profile of the portion 110. The profile of the outer flange side 108 and of the portion 110 is preferably configured in the form of notches (not shown in FIG. 13) distributed, in particular evenly distributed, extending in parallel with the thread axis A. It is understood that the profile can also be of a different type. It is in particular conceivable that in a similar manner to the first embodiment elevated portions and recesses 44 (not shown in FIG. 13) are formed at the side of the flange 106 remote from the second component 14 and serve to be in engagement with shape matching with complementary elevated portions and recesses 42 which are arranged at the side of the portion 110 facing the second component 14.

The fixing of the base element 16 to the second component 14 will be explained with reference to FIG. 14. As can be seen in FIG. 14, the constriction 39 is slightly axially oversized at the side remote from the second component 14 with respect to the end of the bush 102 remote from the second component 14. In other words, the abutment surface 40 is slightly axially spaced apart from the end of the bush 102 remote from the second component 14.

A shim 100 can optionally be provided between the screw nut 96 and the abutment surface 40. The shim 100 is first pressed toward the abutment surface 40 by tightening the screw nut 96 during the assembly. The shim 100 can cut into the material of the constriction 39 of the base element 16 by a further tightening of the screw nut 96 until the shim 100 lies on the end of the bush 102 remote from the second component 14. It is, however, also conceivable that the shim 100 does not cut into the constriction 39, but rather deforms, in particular deforms elastically. The constriction 39 of the base element 16 is clamped tight by the shim 100 and thus ultimately fixes the base element 16 to the second component 14. At the base of the bush 102, a tightening torque specific to the screw can be used to tighten the screw nut 96 in order to fix the base element 16 to the second component 14.

In accordance with the embodiment shown in FIG. 14, the thread axis A of the base element 16 and the longitudinal axis of the threaded bolt 98 coincide in the assembled state of the apparatus. The bush 102 is arranged concentrically around the threaded bolt 98 in this configuration. The bush 102 can, however, also eccentrically surround the threaded bolt 98 so that the thread axis A and the longitudinal axis of the threaded bolt 98 are spaced apart in parallel with one another. A radial adjustment path is defined via the spacing between the thread axis A and the longitudinal axis of the threaded bolt 98. A radial adjustment path of a maximum of 2 mm can preferably be set. Accordingly, in addition to the adjustment of the position of the first component 12 relative to the second component 14 in the direction of the thread axis A, a setting of the position of the first component 12 relative to the second component 14 in a plane perpendicular to the thread axis A is possible.

REFERENCE NUMERAL LIST

12 first component
14 second component
16 base element
18 adjustment element
20 cut-out
22 wall
24 projecting part
26 base element thread
28 adjustment element thread
30 connection means
32 head
34 shaft
36 holder
38 passage
39 constriction
40 abutment surface
42 recess and elevated portion
44 elevated portion and recess
46 screw-in protection
48 unscrewing protection
50 first contour
52 second contour
54 radial overhang 56 wall thickness
58 wall thickness
60 outer jacket surface
62 protrusion
64 engagement feature
66 corner
68 counter bearing
70 spring element
72 projection
74 axial rib
76 widened portion
78 continuation
80 opening
82 internal threaded section
84 counter-piece
86 first section
88 second section
90 inner hollow cylinder
93 outer hollow cylinder
93 cavity
94 gap
96 screw nut
98 threaded bolt
100 shim
102 bush
104 hollow cylindrical section
106 flange
108 outer flange side
110 portion
A thread axis
B axis
C axis

The invention claimed is:

1. An apparatus for attaching a first component to a second component, the apparatus comprising:
a base element which has a thread which defines a thread axis;
a connection means for a direct or indirect connection with shape matching or material continuity of the base element to the second component;
an adjustment element which receives the first component and is in threaded engagement with the base element such that the position of the first component is adjustable relative to the second component, viewed in the direction of the thread axis, by a rotation of the adjustment element relative to the base element,
at least one of the base element and the adjustment element at least partly elastically deformable such that the adjustment element receives the first component free of clearance and is in threaded engagement free of clearance with the base element,
wherein the base element comprises a base element thread and the adjustment element comprises an adjustment element thread, with the base element thread and the adjustment element thread being adapted for a mutual threaded engagement, and with the base element thread, in the assembled state of the apparatus, having a first contour viewed in cross-section and the adjustment element thread having a second contour viewed in cross-section which is different from the first contour such that there is at least a radial overhang with a concentric alignment of the contours.

2. The apparatus in accordance with claim 1, wherein the threaded engagement between the base element and the adjustment element is self-locking.

3. The apparatus in accordance with claim 1, wherein, in the non-assembled state of the apparatus, one of the contours is non-circular and defines a first periphery and the respective other contour is substantially circular and defines a second periphery.

4. The apparatus in accordance with claim 3, wherein the non-circular contour is one of oval or elliptical.

5. The apparatus in accordance with claim 3, wherein a difference between the first periphery and the second periphery is at least approximately zero.

6. The apparatus in accordance with claim 1, wherein, in the non-assembled state of the apparatus, the base element thread has a non-circular contour and the adjustment element thread has a circular contour and is deformable such that the contour of the adjustment element thread adapts to the contour of the base element thread in the assembled state of the apparatus.

7. The apparatus in accordance with claim 6, wherein the adjustment element thread is elastically deformable.

8. The apparatus in accordance with claim 1, wherein at least one engagement feature is provided at the adjustment element.

9. The apparatus in accordance with claim 8, wherein the at least one engagement feature is for a tool.

10. The apparatus in accordance with claim 1, wherein at least one means is provided for a shape-matched and/or force-transmitting fixing of the first component to the adjustment element.

11. The apparatus in accordance with claim 1, wherein the adjustment element has at least one radially outwardly projecting protrusion and at least one radially outwardly projecting counter-bearing, with the at least one protrusion and the at least one counter-bearing being arranged with a spacing from one another in the direction of the threaded axis to receive the first component between them in an at least approximately shape-matched manner.

12. The apparatus in accordance with claim 1, wherein at least one spring element is provided at the adjustment element which is deformable in the radial direction against its return force by the received first component.

13. The apparatus in accordance with claim 1, wherein a plurality of protrusions and/or a plurality of counter-bearings and/or a plurality of spring elements are each arranged distributed about the adjustment element in the peripheral direction.

14. The apparatus in accordance with claim 1, further comprising a holder which is rotationally configured or mountable to the second component and can be brought into engagement with shape matching with the base element.

15. The apparatus in accordance with claim 1, wherein the holder comprises an end face which faces the base element and at which at least one elevated portion or recess is formed and the base element has a surface at a constriction of a passage which faces the holder and at which at least one corresponding recess or elevated portion is formed.

16. The apparatus in accordance with claim 1, further comprising a connection means for connecting the base element to the second component or to a holder which is mounted thereto and with the holder comprising a head and a shaft, with the base element and, optionally, the holder having a passage which extends in the direction of the thread axis for receiving the shaft, and with a constriction projecting radially inwardly into the passage at whose side remote from the holder an abutment surface for the head of the connection means is formed.

17. The apparatus in accordance with claim 1,
wherein the base element forms a non-round continuation at its end facing the second component and the second component has a correspondingly shaped opening into which the non-round continuation of the base element can be inserted.

18. The apparatus in accordance with claim 1,
wherein, to connect the base element to the second component, a threaded bolt is formed at the second component and a screw nut is provided which can be screwed on the threaded bolt and the base element has a passage extending in the direction of the thread axis for receiving the screw nut and a constriction projects radially inwardly into the passage and serves to receive the threaded bolt such that the constriction is clamped between the screw nut and the second component in the assembled state of the apparatus.

19. The apparatus in accordance with claim 18,
further comprising a bush which is arranged between the constriction and the threaded bolt and has a flange which faces the second component and which is radially outwardly bounded by an outer flange side, with the outer flange side being profiled and being in engagement with shape matching with a complementarily profiled portion in the constriction to fix the base element rotationally fixedly to the second component.

20. The apparatus in accordance with claim 1,
wherein the adjustment element comprises an inner hollow cylinder and an outer hollow cylinder which coaxially surround the thread axis, with the inner hollow cylinder and the outer hollow cylinder being held radially at a distance by engagement features.

* * * * *